Figure 1:
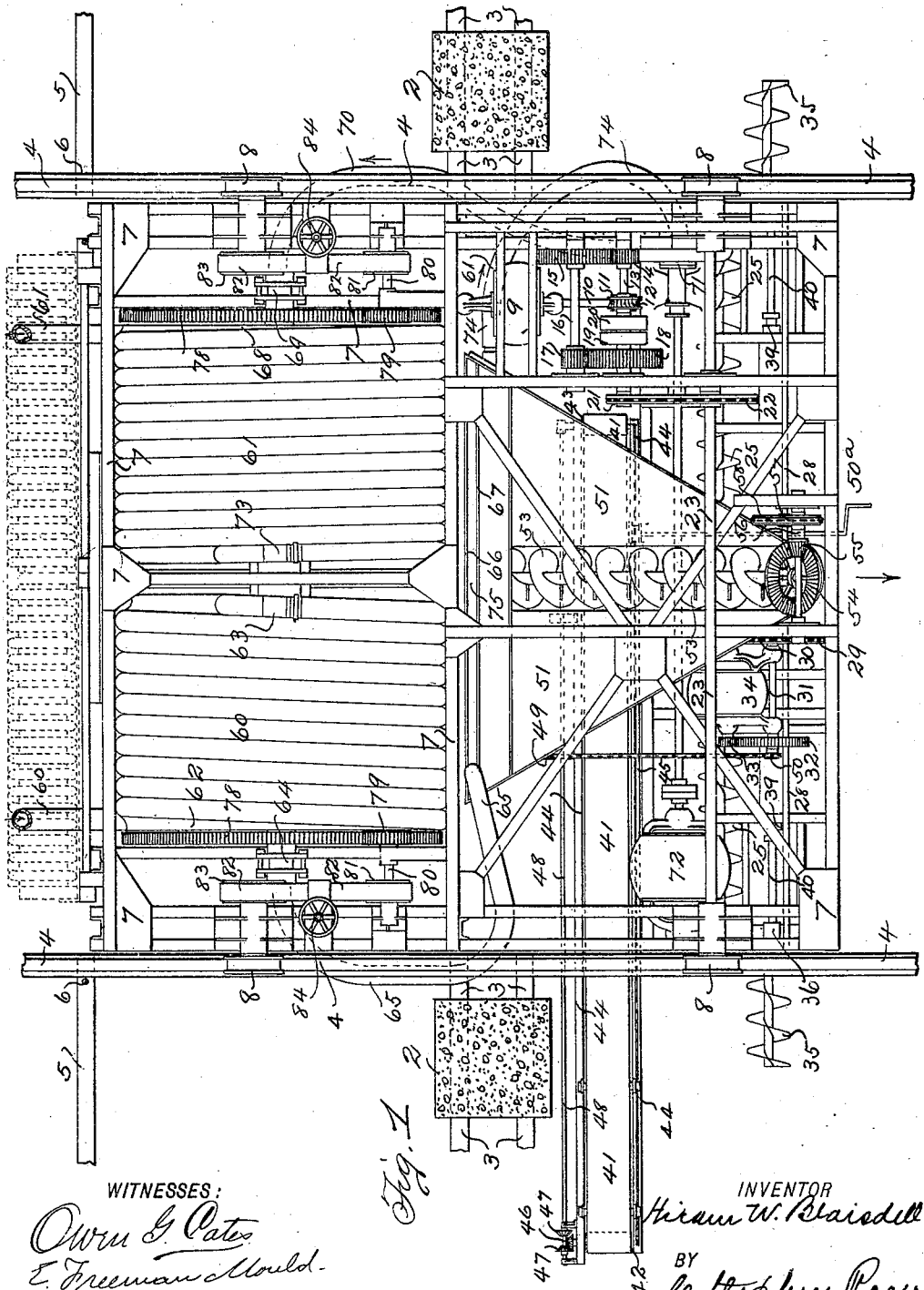

No. 842,850. PATENTED FEB. 5, 1907.
H. W. BLAISDELL.
DISTRIBUTING MACHINE FOR CLOSED FILTERS.
APPLICATION FILED NOV. 16, 1904.

5 SHEETS—SHEET 1.

WITNESSES:
INVENTOR
Hiram W. Blaisdell
BY
his ATTORNEY

No. 842,850. PATENTED FEB. 5, 1907.
H. W. BLAISDELL.
DISTRIBUTING MACHINE FOR CLOSED FILTERS.
APPLICATION FILED NOV. 16, 1904.

5 SHEETS—SHEET 2.

WITNESSES:

INVENTOR
Hiram W. Blaisdell
BY
his ATTORNEY

No. 842,850. PATENTED FEB. 5, 1907.
H. W. BLAISDELL.
DISTRIBUTING MACHINE FOR CLOSED FILTERS.
APPLICATION FILED NOV. 16, 1904.

5 SHEETS—SHEET 4.

WITNESSES:
Owen G. Cates.
E. Freeman Mould

INVENTOR
Hiram W. Blaisdell
BY
C. Stephen Rogers
his ATTORNEY

No. 842,850. PATENTED FEB. 5, 1907.
H. W. BLAISDELL.
DISTRIBUTING MACHINE FOR CLOSED FILTERS.
APPLICATION FILED NOV. 16, 1904.

5 SHEETS—SHEET 5.

WITNESSES:

INVENTOR
Hiram W. Blaisdell
BY
Stephen Rogers
his ATTORNEY

UNITED STATES PATENT OFFICE.

HIRAM W. BLAISDELL, OF LOS ANGELES, CALIFORNIA.

DISTRIBUTING-MACHINE FOR CLOSED FILTERS.

No. 842,850. Specification of Letters Patent. Patented Feb. 5, 1907.

Application filed November 16, 1904. Serial No. 233,005.

*To all whom it may concern:*

Be it known that I, HIRAM W. BLAISDELL, a citizen of the United States, residing at Los Angeles, in the county of Los Angeles and State of California, have invented certain new and useful Improvements in Distributing-Machines for Closed Filters; and I do hereby declare the following to be a full, clear, and exact description of the invention, such as will enable others skilled in the art to which it appertains to make and use the same.

This invention relates to means for operating upon covered or obstructed filtration plants or filter-beds, and particularly to machines for distributing filtering material; and some of the objects of the invention are to provide a machine of this general character which will be simple and cheap in construction and efficient for the purpose intended.

Another object of the invention is to provide a machine constructed to travel beneath the covering or roof of covered or obstructed filter-beds and to be capable of movement over the entire surface of the filter-bed to effect the even and uniform distribution of filtering material.

It is also an object of the invention to provide a machine constructed to distribute material upon or throughout covered filter-beds without exerting injurious or damaging pressure upon the material constituting the same.

A further object of the invention is to provide means for supplying filtering material continuously and mechanically during the operation of distributing such material over the surface to be covered and to effect the even and uniform distribution thereof.

Still another object of the invention is to effect the even and uniform distribution of the filtering material around or adjacent to the support of covered filters or other obstructions.

With these and other objects in view the invention consists, essentially, in the construction, combination, and arrangement of parts, substantially as more fully described in the following specification, and as illustrated in the accompanying drawings, forming part of this application, in which—

Figure 2:
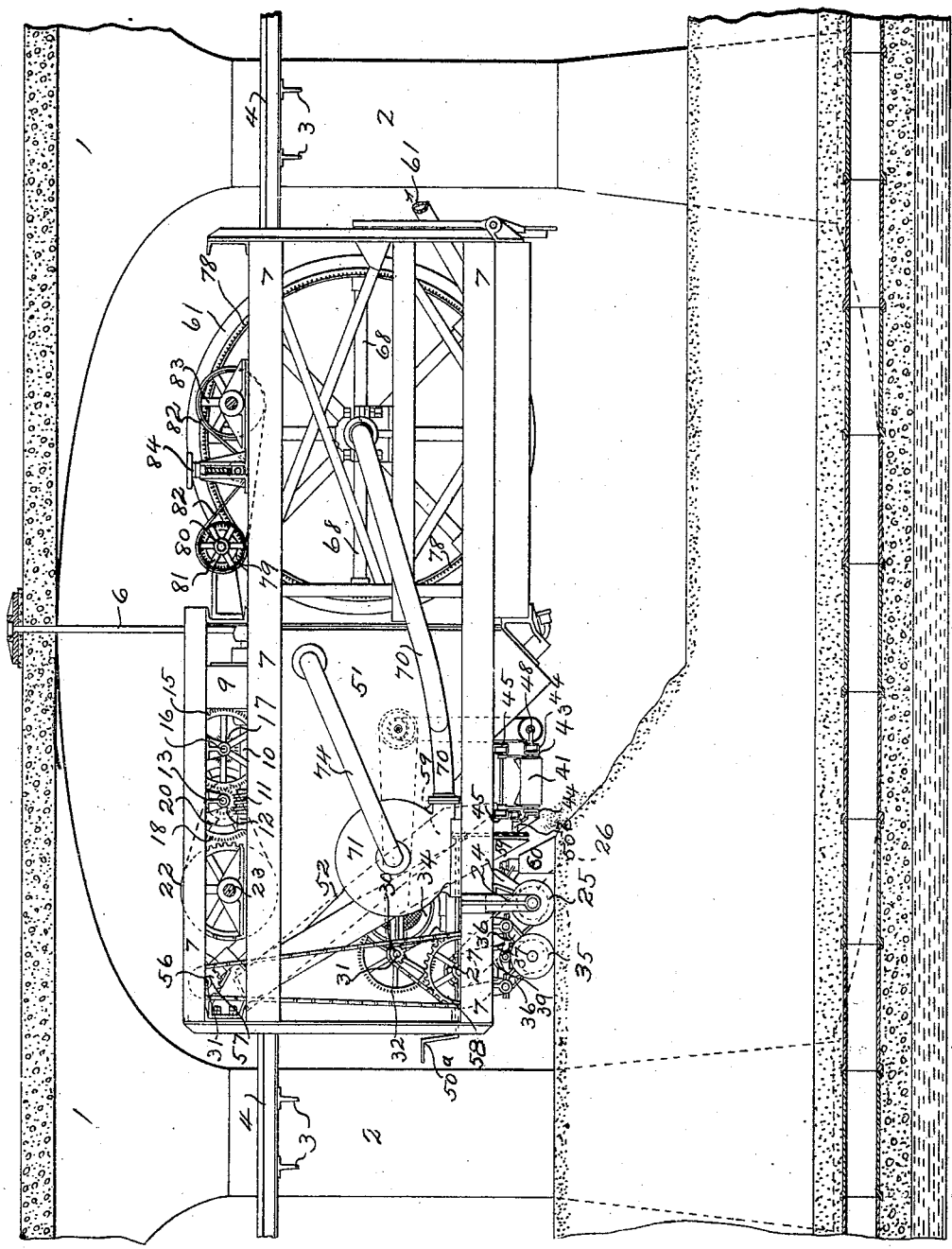
Figure 3:
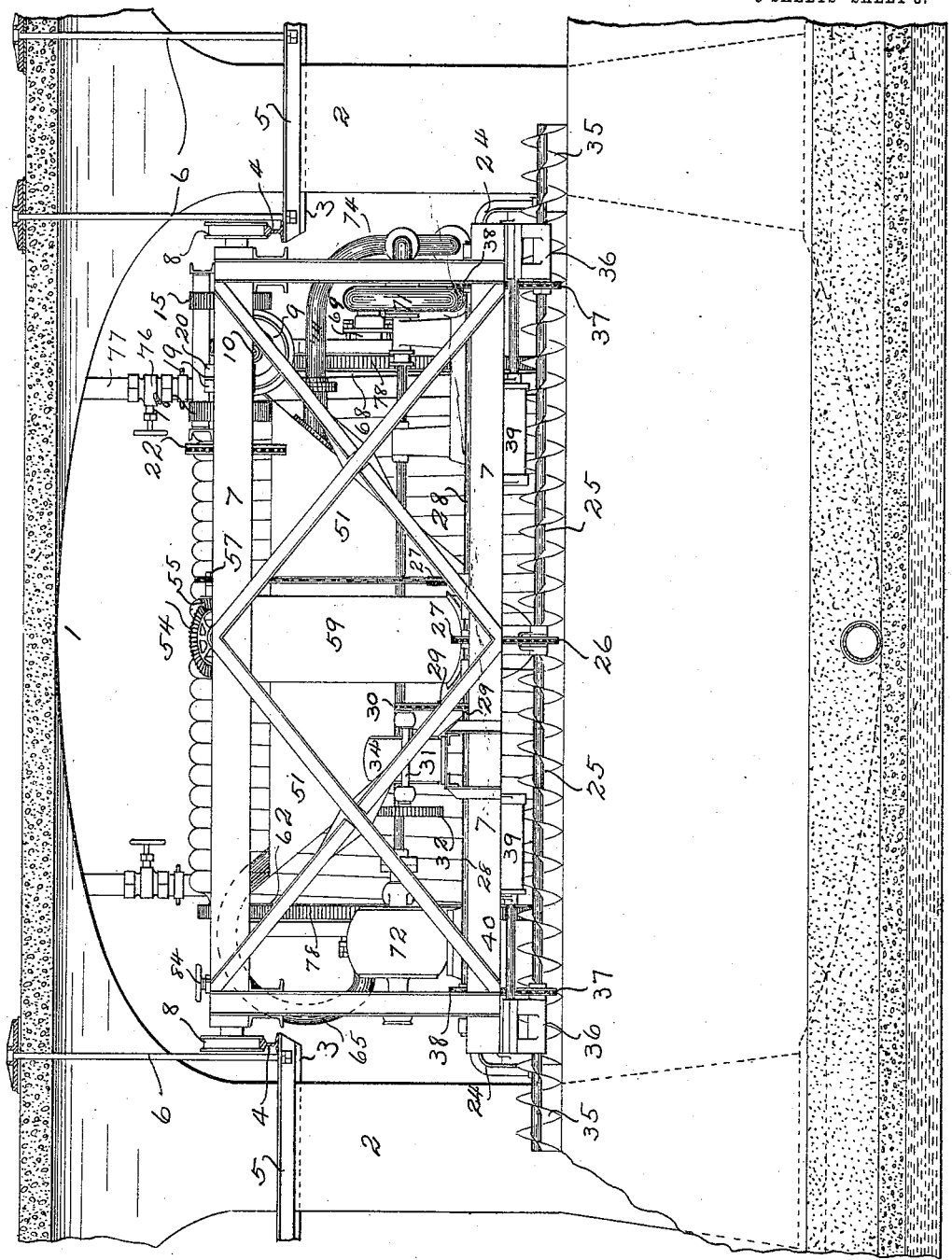
Figure 4:
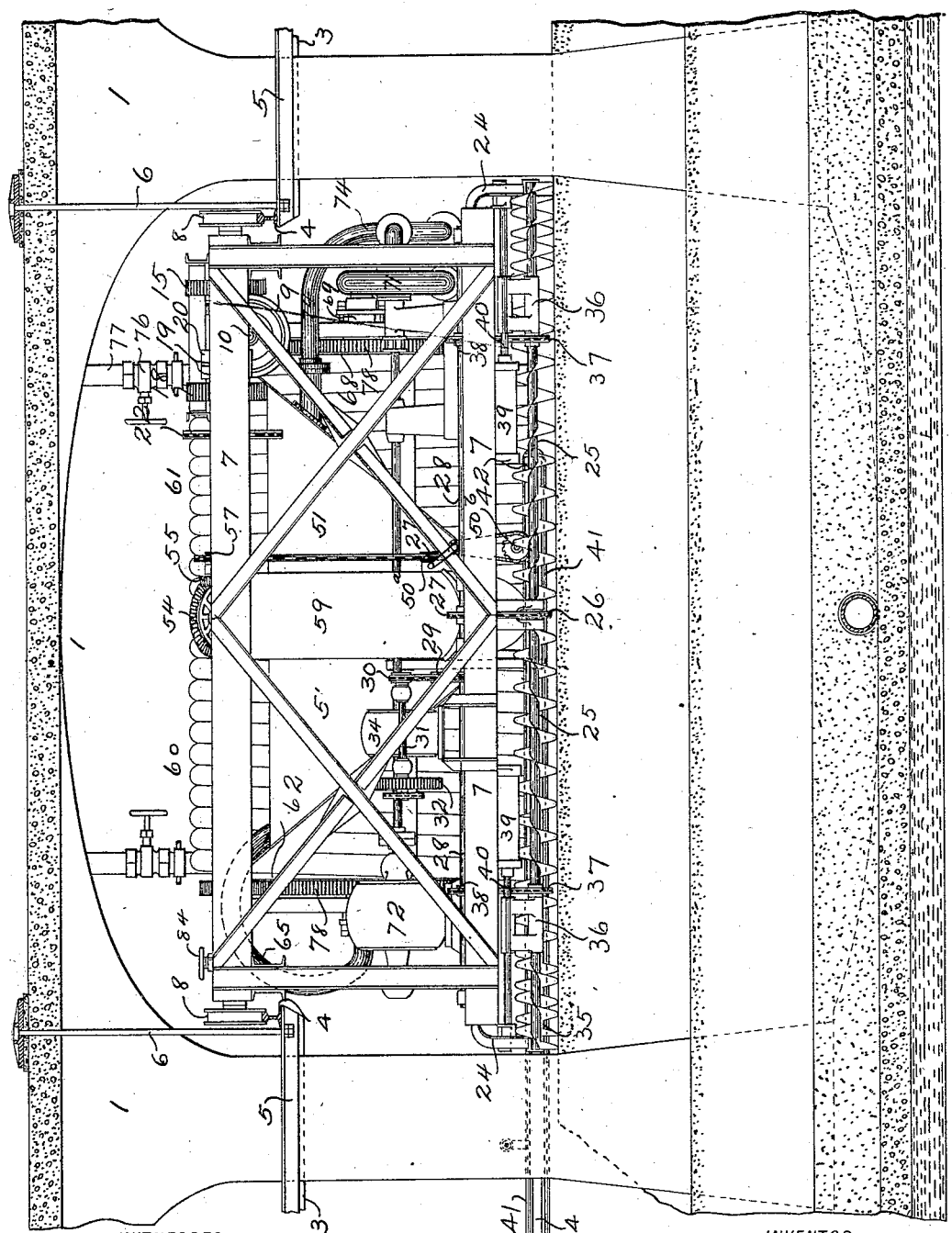
Figure 5:
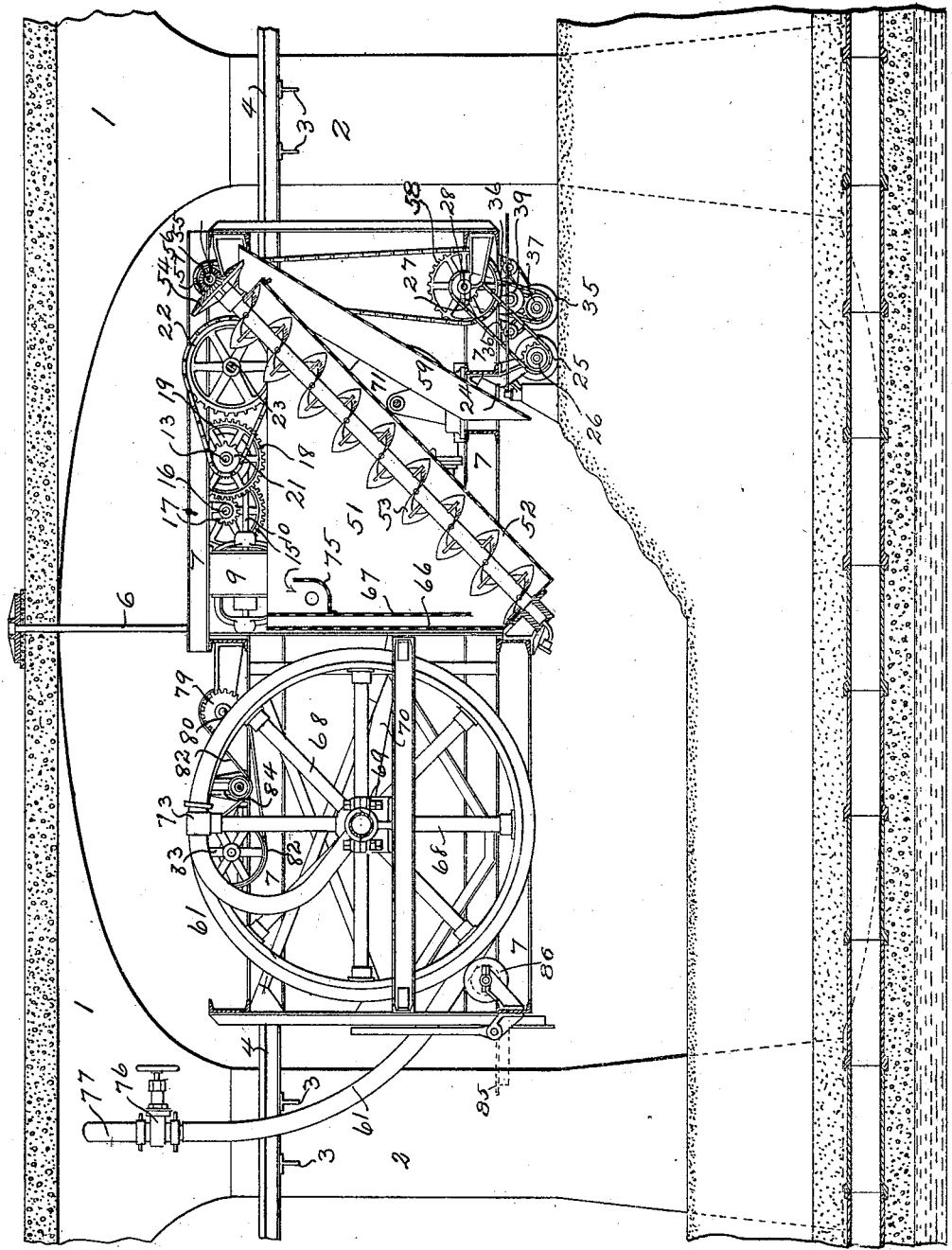

Figure 1 is a top plan view of a distributing-machine, showing the covering of the filter removed. Fig. 2 is a side elevational view of the same. Fig. 3 is a front elevational view of the same, showing the auxiliary or wing conveyers extended. Fig. 4 is a view similar to Fig. 3, showing the auxiliary or wing conveyers retracted; and Fig. 5 is a longitudinal central sectional view of the machine.

Similar characters of reference designate corresponding parts throughout the several views.

This invention is particularly designed and adapted for use upon filtration works or filter-beds which are partially or entirely covered or roofed over, or which are constructed with obstructions in the form of columns, buttresses, or otherwise, by reason of which machinery capable of use upon open filter-beds cannot be employed, and the handling or transporting of the filtering material is required to be done by hand or by the employment of manual labor.

In the operation of filtration works or slow-sand filter it becomes necessary to scrape the filter whenever the yield of water therefrom becomes diminished by reason of the surface of the filter becoming clogged; and the material scraped off or removed is returned and replaced upon the filter-bed after having been washed or cleansed; but the return of the washed filtering material is now accomplished in covered filters by means of manual labor involving a great expense of time and money as well as injuring the filter-bed by reason of the pressure or weight of the operators walking thereon and the material handled.

Although this invention relates particularly to use upon covered or obstructed filtration plants or filter-beds and is so shown and described herein, yet it is in no manner confined or limited to such use; and the right is reserved to use this invention for the many other applications of which it is capable.

Referring to the drawings, the reference character 1 designates a portion of the covering or roof of a filtration plant or slow-sand-filter bed, which covering is preferably of the groined arch type, supported by columns or piers 2, provided with brackets or supports 3 for tracks or ways 4, and the latter may be provided with intermediate supports 5, suspended from the roof 1 by rods or hangers 6, substantially in the manner illustrated.

A traveling structure or frame 7 of any suitable construction is desirably provided with supporting-wheels 8, adapted to travel upon the tracks 4, which may extend longitudinally of each bay or gallery of the filtration plant or filter-bed, as will be readily understood.

An electric motor 9, Fig. 1, having suitable connections with the source of electrical supply, may be suitably mounted in or upon the traveling structure or frame 7, and on the drive-shaft 10 of this motor may be secured a worm 11, meshing with a worm-wheel 12 on a clutch-shaft 13, carrying a fast pinion 14, engaging a gear-wheel 15, fast on a counter-shaft 16, also carrying a fast pinion 17, meshing with a gear-wheel 18 on the hub of a clutch 19, loose on the shaft 13, whereon is feathered a clutch 20 by means of which gears the machine may be progressed in a forward direction at a slow rate of speed and in a rearward direction at a high rate of speed when the clutches 19 and 20, respectively, are operated, as when clutches 19 and 20 are locked sprocket 21 turns at the speed of shaft 13, and when clutches 19 and 20 are not locked the reducing-gear causes sprocket 21 to operate at a slower speed.

Fast upon the sleeve of gear-wheel 18, loosely mounted upon the end of the shaft 13, is a sprocket-wheel 21, chained to a large sprocket-wheel 22 on the propelling-shaft 23, carrying the forward supporting-wheels 8, whereby the machine is progressed or caused to travel along or upon the tracks or ways 4 throughout the entire length of each bay or gallery of the filter.

Revolubly mounted in bearings 24, formed on or connected with the lower portion of the traveling structure or frame 7, is a main conveyer or screw 25, upon the shaft whereof is preferably secured a sprocket-wheel 26, Figs. 2, 3, and 5, chained to a sprocket-wheel 27 upon an operating-shaft 28, also carrying a large sprocket-wheel 29, chained to a sprocket-pinion 30 upon a counter-shaft 31, also provided with a large gear-wheel 32, meshing with a pinion 33 on the drive-shaft of an electric motor 34, having suitable connections with the source of electrical supply.

By means of the construction just described motion is imparted to the main conveyer or endless right and left hand screw 25, which effects the distribution of the material laterally from the middle of the machine, where it is preferably delivered or discharged.

To effect the even and uniform distribution of the filtering material in the line with or around the piers or columns 2 and other obstructions in the filter, there is preferably provided extensible and retractible auxiliary or wing conveyers or endless screws 35, desirably revolubly mounted in sliding or reciprocating bearings 36, suitably mounted in guides or ways in the forward lower corners of the traveling structure or frame 7, substantially as shown in Figs. 1, 3, and 4, said conveyers being illustrated in the extended position in Figs. 1 and 3 and in the retracted position in Fig. 4 of the drawings.

The auxiliary or wing conveyers 35 are preferably revolved by means of a sprocket-wheel 37 on the shaft of each of said conveyers, which wheels are chained to similar wheels 38 upon the operating-shaft 28, driven in the manner before described, and the extension and retraction of said auxiliary conveyers is preferably effected by means of hydraulic cylinders 39, having piston-rods 40 connected with the sliding bearings 36 of the auxiliary conveyers 35 and provided with suitable hydraulic connections to effect the operation of the piston-rods.

If found desirable in practice, an endless belt conveyer or other device 41 may be employed to discharge or distribute a portion of the filtering material into the adjoining bay or gallery of the filter-bed, substantially as illustrated in Figs. 1, 2, and 4 of the drawings, and this belt conveyer preferably passes over driving and tail pulleys 42 and 43, respectively, revolubly mounted in the ends of a rectangular frame 44, desirably constructed to slide upon rails or in guides 45, formed on or connected with the lower portion of the traveling structure or frame 7, substantially as shown in Figs. 1, 2, and 4 of the drawings. This extensible and retractible belt conveyer is preferably progressed, by means of a bevel-gear 46, Fig. 1, upon the shaft of the driving-pulley 42 thereof, which meshes with bevel-gears 47 on a shaft 48, mounted in bearings connected with the conveyer-frame 44 and carrying a splined sprocket-wheel 49, chained to a sprocket-pinion 50 on the counter-shaft 31, having a gear-wheel 32, driven by the pinion 33 on the shaft of the motor 34, before described.

The belt conveyer may be extended or retracted by means of a crank-rod 50$^a$, belted or chained to a shaft 50$^b$, engaging the conveyer-frame 44 or by any other suitable device that may be found desirable in practice.

Preferably mounted in the forward central portion of the traveling structure or frame 7 is a receiver or hopper 51 of any desired construction and size desirably provided with an inclined or oblique bottom 52, Figs. 2 and 5, adjacent to which and within the receiver is preferably revolubly mounted a conveyer or endless screw 53, provided with a bevel-gear 54, meshing with a bevel-pinion 55 on a horizontal shaft 56, journaled in the upper forward portion of the frame 7 and carrying a sprocket-wheel 57, chained to a sprocket-wheel 58 on the operating-shaft 28, driven in the manner before described.

A chute or conduit 59 may be movably mounted adjacent to and beneath the receiver 51, Figs. 1, 2, and 5, to receive the filtering material discharged from the latter by the conveyer 53 therein and direct such material upon the surface to be covered therewith, as shown in Fig. 2, or the chute 59 may be moved into the position illustrated in dotted lines in said figure, when it will effect the discharge of the material upon the belt conveyer 41 to be by the latter distributed into the adjoining bay or gallery.

A shoe or leveling device 60 of any preferred construction may be connected with the lower forward part of the traveling structure 7, preferably between the main conveyer 25 and the chute 59, substantially as shown in Fig. 5 of the drawings.

The cleansed filtering material is preferably supplied or conducted to the receiver 51 and conducted therefrom by means of flexible connections or hose 60 and 61, respectively, the hose 60 being preferably connected with the source of supply of filtering or other material and being wound upon the reel or drum 62, and having a connection 63 movably attached to one end of a hollow shaft 64, whereon the reel 62 is preferably revolubly mounted, and the other end of the hollow shaft 64 is preferably movably connected with a pipe or connection 65, communicating with the interior of the receiver 51, preferably between the vertical end 66 thereof and the partial partition or division plate 67 of the same essentially as illustrated in Figs. 1, 3, 4, and 5 of the drawings.

The outlet-hose 61 is carried by the reel 68, mounted upon the hollow shaft 69, movably connected with a pipe or connection 70, communicating with an exhausting apparatus 71 operated by motor or other driving device, 72, and the other end of the hollow shaft 69 is movably attached to a connection 73, communicating with the other end of the outlet-hose 61, and the exhausting apparatus 71 is connected, as at 74, with the upper portion of the receiver 51, preferably within the trough or conduit 75 of the receiver, into which conduit the water flows over the free edge thereof and is withdrawn therefrom.

By means of the construction just described the filtering material is continuously supplied to and conducted from the machine throughout the travel thereof along each bay or gallery of the filter, thereby permitting a constant distribution of filtering material over the surface desired to be covered therewith, and the outlet-hose or flexible connection 61 may be provided with a valve or cut-off 76, adapted to be removably connected with an outlet pipe or conduit 77 (shown as passing through the wall of the filter) and being understood as terminating at the point of discharge of the vehicle or fluid used to convey the filtering material to the machine.

The reels are preferably unwound or the inlet and outlet hose 60 and 61 are preferably paid out by the travel of the machine in a forward direction and are rewound upon the reels desirably by means of large gears 78, meshing with suitable idlers (not shown) driven by pinions 79 on shafts 80, each carrying a pulley 81, connected by a belt 82 with a pulley 83 on the shaft of each of the rear supporting-wheels 8, and continuing or take-up devices 84 may be provided to keep the belts 82 tight during the rewinding of the hose thereon, as will be readily understood.

The operation of the invention will be readily understood from the foregoing description when taken in connection with the accompanying drawings and the following explanation thereof.

The machine is first placed in operating position—as, for instance, at the supply end of one of the bays or galleries of a covered slow-sand-filter bed—and the inlet-hose 60 is connected with the source of supply of the filtering material, it being understood that the filtering material is conveyed through the hose, preferably by means of a fluid-vehicle, which overflows into the conduit 75, while the material settles by gravity and the outlet-hose 61 is connected with the outlet-pipe 77, whereupon the propelling-motor 9 is started, which drives the worm-wheel 12 on the shaft 13, carrying the pinion 14, meshing with the gear-wheel 15 on the counter-shaft 16, also provided with a pinion 17, meshing with the gear 18 on the hub of a clutch 19 on the shaft 13, which shaft also carries a sprocket 21, chained to a sprocket 22 on the propelling-shaft 23, carrying the forward supporting-wheels 8, thus imparting a forward motion to the machine desirably at a slow rate of speed.

The actuating-motor 34 is likewise started, thereby actuating the pinion 33 on the drive-shaft thereof, which pinion meshes with the large gear-wheel 32 on the counter-shaft 31, carrying a sprocket 30, chained to sprocket-wheel 29 on the operating-shaft 28, also carrying a sprocket-wheel 27, chained to a sprocket-wheel 26 upon the main conveyer 25, and the revolution of the operating-shaft 28 rotates sprocket 38 thereon, which are chained to sprockets 37 on the shafts of the auxiliary or wing conveyers 35, thus imparting motion to the main and wing conveyers.

A sprocket 58 on the operating-shaft 28 drives the sprocket 57 on the shaft 56, carrying the beveled pinion 55, meshing with and driving the inclined conveyer or elevator 53 in the receiver, and the movable chute 59 being in the discharging position, as shown in full lines in Fig. 2 of the drawings, the operation is as follows:

The cleansed filtering material is conveyed through the inlet-hose 61 by the liquid or other vehicle under pressure and enters the top of the receiver 51, settling by gravity to the bottom of the receiver, where the cleansed filtering material is taken up by the elevator 53 and progressed upwardly and discharged into the chute 59 upon the surface to be covered, which discharge takes place during the travel of the machine along the bay or gallery in which the same is operating, Figs. 2 and 5 of the drawings.

The shoe or leveling device 60 roughly spreads or deflects the material discharged from the chute 59, and the succeeding main conveyer takes up the same and progresses it laterally in a uniform and even manner to the width of the bay or gallery between the piers 2, whereupon the auxiliary or wing conveyers are extended when the machine shall have reached a position wherein the same are not in a line with or between the piers, the extension of the auxiliary conveyers being effected through the hydraulic cylinders 39 and the piston-rods 40, whereupon the material is further progressed laterally and is uniformly distributed or leveled around and on a longitudinal line with the piers 2, as will be readily understood.

If it is desired to discharge the material into the adjacent bay or gallery, the chute 59 is elevated into the position shown in dotted lines in Fig. 2, whereupon the material will be directed thereby upon the belt conveyer 41, which has previously been extended into the position shown in Figs. 1 and 4 of the drawings by means of the operating-handle 50ª.

When the machine shall have reached the other end of the bay or gallery or the extreme limit of its travel and the hose 60 and 61 shall have been unwound or paid out, then the operating-motor 34 is stopped and the propelling-motor is reversed, thereby returning the machine to its starting position at a high rate of speed, and during the return of the machine to its initial position the hose will be rewound upon the reel through the rotation of the rear supporting-wheels 8, pulleys 83 and 81, pinions 79, and the idlers meshing with large gears 78 on each of the reels.

If found desirable in practice, a platform 85 may be movably connected with the lower rear portion of the traveling structure or frame 7 to accommodate or for the use of the operator in charge of the machine, and a roller or any friction device 86 may be employed adjacent to the reels to facilitate the winding and unwinding of the hose thereon.

This invention is not limited or confined to the means shown and described for progressing the machine or for driving the parts, and other instrumentalities may be employed for the traction of the machine and for operating one or more elements of the same, and the location and arrangement of conveyers may be changed in practice and other changes and modifications may be made of the construction, combination, and arrangement of parts shown and described without departing from the spirit and scope of this invention.

I claim—

1. A machine constructed to operate from a fixed support within a covered filter provided with means for distributing material and mechanism for operating the parts.

2. A covered filter provided with supporting means beneath the cover, a machine constructed to travel thereon provided with mechanism for distributing material and instrumentalities for operating the parts.

3. A machine constructed to operate from a fixed support within a covered filter, means for distributing material carried thereon, devices for supplying the material to said means and mechanism for operating the parts.

4. A covered filter provided with suspending means beneath the cover, a traveling structure supported from said means constructed to distribute material and mechanism for operating the parts.

5. A machine of the character described provided with means for distributing material, apparatus for supplying material to said machine, a vehicle for conveying material to said apparatus, means for conducting the vehicle therefrom and mechanism for operating the parts.

6. A covered filter provided with suspending means, mechanism engaging said means constructed to distribute the material, apparatus for supplying the material to said machine, a vehicle for conveying material to said apparatus, means for conducting the vehicle of said material from said machine and instrumentalities for operating the parts.

7. A machine of the character described provided with means for distributing the material, apparatus connecting the source of material-supply and said machine to continuously supply the latter throughout the travel of the machine, a vehicle for conveying the material from said source to said machine and mechanism for operating the parts.

8. A machine of the character described, provided with distributing means, a flexible connection between said machine and the source of material-supply, a vehicle for conveying the material through said connection to said machine and mechanism for operating the parts.

9. A covered filter provided with supporting means, mechanism constructed to travel in engagement with said means, to effect the distribution of material, a flexible connection between the source of material-supply and said mechanism to continuously supply the latter during the travel thereof, a vehicle for conveying material through said connection to said mechanism and instrumentalities to operate the parts.

10. A machine of the character described provided with distributing means, a flexible connection between said machine and the source of material-supply, a vehicle for conveying material from said source to said machine, an outlet for said vehicle, a flexible connection between said machine and said outlet and instrumentalities for operating the parts.

11. A machine of the character described provided with distributing means, a source of material-supply, a connection between said source and said machine, a vehicle for conveying material through said connection, an outlet for said vehicle, a connection between said machine and said outlet and instrumentalities for operating the parts.

12. A machine of the character described provided with distributing means, a source of supply, a vehicle for conveying material from said source to said machine, an outlet for said vehicle, reels carried by said machine, flexible connections upon said reels connecting said machine respectively with the source of material-supply and the outlet and instrumentalities for operating the parts.

13. A machine of the character described provided with distributing means, a source of supply, a vehicle for conveying material from said source to said machine, an outlet for said vehicle, reels operated by the travel of the machine, inlet and outlet connections upon said reels, connecting said machine respectively with the source of supply and the outlet and instrumentalities for operating the parts.

14. A machine of the character described provided with distributing means, apparatus for supplying material thereto, a fluid-vehicle for carrying the material, means for discharging the vehicle and mechanism for operating the parts.

15. A machine of the character described provided with distributing means, a source of supply, a vehicle for conveying material from said source to said machine, an outlet for said vehicle, reels carried by the machine, devices for operating the reels by the movement of the machine, inlet and outlet connections connecting said machine respectively with the source of supply and the outlet, whereby the machine is continuously supplied with material throughout the movement thereof and instrumentalities for operating the parts.

16. A covered filter provided with supporting means, a distributing mechanism constructed to travel on said means, reels on said machine, devices for operating the reels from the travel of the machine, flexible connections upon said reels for respectively supplying and discharging material, and instrumentalities for operating the parts.

17. A machine of the character described provided with a rotary distributing device, means for supplying material to the machine and mechanism for operating the parts.

18. A machine of the character described provided with main and auxiliary distributing devices, whereby the material may be distributed around obstructions and mechanism for operating the parts.

19. A machine of the character described provided with a main distributer, auxiliary distributers, devices for extending and retracting the latter and instrumentalities for operating the parts.

20. A machine of the character described provided with distributing devices, means for extending and retracting said devices to effect the distribution of material around obstructions and mechanism for operating the parts.

21. A machine of the character described provided with means for supplying material, movable bearings, devices for moving the bearings, distributers mounted in said bearings and mechanism for operating the parts.

22. A machine of the character described provided with a main distributer, auxiliary distributers, means for extending and retracting the latter, an operating-shaft constructed to drive said main and auxiliary distributers and mechanism for operating the parts.

23. A machine of the character described provided with fluid means for supplying material, a receiver for the material a device for discharging the material from the receiver and mechanism for operating the parts.

24. A machine of the character described provided with fluid means for supplying material, a receiver for the material, an elevator to discharge the material from the receiver and mechanism for operating the parts.

25. A machine of the character described provided with an elevator for discharging the material from the machine, rotary distributers and mechanism for operating the parts.

26. A machine of the character described provided with fluid means for supplying material, a receiver a discharging device therein, distributers and mechanism for operating the parts.

27. A machine of the character described provided with inlet and outlet apparatus for conducting filter material and its vehicle and discharging the vehicle respectively, a receiver connected with said apparatus, a device for discharging the material from said receiver, distributers, and mechanism for operating the parts.

28. A covered filter provided with supporting means, a structure constructed to travel on said means, a receiver, flexible inlet and outlet connections for the receiver, whereby material is conveyed to the receiver by a fluid-vehicle and the vehicle is discharged therefrom, a device for discharging the material from said receiver, a main distributer, extensible and retractible auxiliary distributers, and mechanism for operating the parts.

29. A machine of the character described provided with supporting means, a structure constructed to travel on said means, a receiver, flexible inlet and outlet connections for the receiver, whereby material is conveyed to the receiver by a fluid-vehicle and the vehicle is discharged therefrom, a device for discharging the material from said receiver, a main distributer, extensible and retractible auxiliary distributers, and mechanism for operating the parts.

30. A covered filter provided with supporting means, a structure constructed to travel on said means, reels carried by said structure, devices interposed between the supporting-wheels of said structure and said reels to operate the latter by the travel of the structure, a receiver upon the structure, flexible connection between the receiver and the source of material-supply, a vehicle for the material, flexible connection between the receiver and the outlet for the vehicle of the material, apparatus for effecting the discharge of the vehicle from the receiver, a device for discharging the material from the receiver, and instrumentalities for operating the parts.

31. A covered filter provided with supporting means, a structure constructed to travel on said means, reels carried by said structure, devices interposed between the supporting-wheels of said structure and said reels to operate the latter by the travel of the structure, a receiver upon the structure, flexible connection between the receiver and the source of material-supply, a vehicle for the material, flexible connection between the receiver and the outlet for the vehicle of the material, apparatus for effecting the discharge of the vehicle from the receiver, a device for discharging the material from the receiver a distributer, auxiliary distributers and instrumentalities for operating the parts.

32. A covered filter provided with supporting means, a structure constructed to travel on said means, reels carried by said structure, devices interposed between the supporting-wheels of said structure and said reels to operate the latter by the travel of the structure, a receiver upon the structure, flexible connection between the receiver and the source of material-supply, a vehicle for the material, flexible connection between the receiver and the outlet for the vehicle of the material, apparatus for effecting the discharge of the vehicle from the receiver, a device for discharging the material from the receiver, a main distributer, reciprocating auxiliary distributers and instrumentalities for operating the parts.

33. A machine of the character described provided with means for conveying commingled sand and water thereto from without the filter, apparatus for separating the sand from the water, instrumentalities for distributing the sand and mechanism for operating the parts.

34. A machine of the character described provided with means for conveying the material to the machine from without the filter, a conveying element for said material, means for separating the material from the conveying element, apparatus for discharging the material and mechanism for operating the parts.

35. A machine of the character described provided with flexible means for conveying material thereto from without the filter, a conveying element for said material, apparatus for separating the material from the conveying element, devices for discharging the separated material and mechanism for operating the parts.

36. A machine of the character described provided with a receiver, apparatus for conveying combined sand and water to the receiver from without the filter, devices for separating the same from the water, means for disposing of the water and mechanism for operating the parts.

37. A machine of the character described provided with means for conveying water and sand from without the filter to the machine under pressure, means for separating the sand from the water, means for discharging the sand and mechanism for operating the parts.

38. A machine of the character described provided with means for conveying material thereto by the action of a conveying element, apparatus to effect the settling of the material from said element, means for discharging the material and mechanism for operating the parts.

39. A machine of the character described provided with means for conveying material to the machine in the presence of a conveying element, apparatus for effecting the settling of material from the element, and devices for disposing of the conveying element and mechanism for operating the parts.

40. A machine of the character described provided with means for conducting material to the machine in the presence of a conveying element, apparatus for effecting the gravitation of the material from the element, and devices for discharging the material from the machine, means for disposing of the conveying element and mechanism for operating the parts.

41. A covered filter provided with suspending means within the covering thereof, a machine constructed to engage said means to effect the distribution of material and mechanism for operating the parts.

42. A filter provided with a covering supported by piers, means supported by said piers beneath said covering to receive a machine, a machine constructed to engage said means to effect the distribution of material and mechanism for operating the parts.

43. A filter provided with a covering having suitable supports, tracks connected with said supports beneath said covering, a distributing-machine constructed to travel on said tracks and mechanism for operating the parts.

In testimony whereof I have signed my name to this specification, in the presence of two subscribing witnesses, at Los Angeles, county of Los Angeles, State of California, this 2d day of November, 1904.

HIRAM W. BLAISDELL.

Witnesses:
H. T. MORROW,
MIGNON FORD.